(12) United States Patent
Kluijtmans et al.

(10) Patent No.: US 6,627,667 B2
(45) Date of Patent: Sep. 30, 2003

(54) PROCESS FOR PREPARING A MODIFIED POLYMER

(75) Inventors: Sebastianus Gerardus J. M. Kluijtmans, Utrecht (NL); Jan Bastiaan Bouwstra, Bilthoven (NL); Yuzo Toda, Goirle (NL)

(73) Assignee: Fuji Photo Film B.V., Tilburg (NL)

( * ) Notice: Subject to any disclaimer, the term of this patent is extended or adjusted under 35 U.S.C. 154(b) by 0 days.

(21) Appl. No.: 09/898,723

(22) Filed: Jul. 3, 2001

(65) Prior Publication Data

US 2002/0015929 A1 Feb. 7, 2002

(30) Foreign Application Priority Data

Jul. 4, 2000 (EP) ........................................... 000202357

(51) Int. Cl.$^7$ ............................... C08J 5/20; C08F 6/16
(52) U.S. Cl. ........................... 521/25; 521/32; 528/482; 528/422; 528/502 R; 430/642; 430/643
(58) Field of Search ...................... 521/25, 32; 528/482, 528/422, 502 R; 430/642, 643

(56) References Cited

FOREIGN PATENT DOCUMENTS

EP  0 576 911  1/1994

*Primary Examiner*—Duc Truong
(74) *Attorney, Agent, or Firm*—Merchant & Gould, P.C.

(57) ABSTRACT

The invention is directed to a process for modifying a water soluble polymer, said process comprising modifying a polymer containing amine groups, by reacting at least one of said amine groups with activated ester, said ester being the reaction product of a carboxyl activator and the carboxyl group of a molecule R—COOH, said R-group being a functional group, to produce a reaction mixture containing a polymer, said polymer containing at least one amide group;

subjecting said reaction mixture to at least ion exchange chromatography to purify said reaction mixture, said purification comprising at least partly removing the said reaction product, and/or carboxyl activator.

16 Claims, No Drawings

PROCESS FOR PREPARING A MODIFIED POLYMER

BACKGROUND OF THE INVENTION

The use of gelatin in the art of manufacturing light sensitive materials is well known. Gelatin plays an important role in manufacturing the light sensitive silverhalide emulsions, but also as a matrix in which the silverhalide crystals and, for example, oil-droplets containing colorforming chemicals are dispersed.

It is common practice to chemically modify gelatin to make it better suited for its innate functions (eg. oxidation of methionine groups to influence crystal morphology (U.S. Pat. No. 4,713,320), adjusting hardening properties (U.S. Pat. No. 5,816,902)).

Several methods to link functional groups to gelatin using carboxyl-activators like carbodiimides, carbamoylpyridinium compounds, carbamoyloxypyridinium compounds, di-cation ethers, are described in EP patent 0,576,911 or EP patent 0,487,686. However, the use of N-hydroxy succinimide (NHS) as a carboxyl-activator was not disclosed in these patents.

The use of activated esters of N-hydroxy-succmimide to form peptide linkages between functional groups, like carboxyl groups and primary amines, has been described (Anderson et al., 1964, J.AM.Chem. Soc. 86:1839–1842, U.S. Pat. No. 5,366,958), but was not disclosed in combination with gelatin before.

An activated NHS ester can be made by forming an ester-bond between the activating compound NHS and the functional group which properties should be superimposed onto those of gelatin. Upon addition of the activated NHS-ester, the NHS is substituted by an amino group of gelatin. In the example as shown below, dihydroxybenzoic acid (DHBA) is esterified with NHS. The resulting ester is said to be 'activated' since DHBA itself will not bind to the aminogroup of gelatin while the DHBA-NHS ester will. As a result, a chemically modified gelatin is obtained which has now the new scavenger-functionality superimposed onto it, while NHS is liberated:

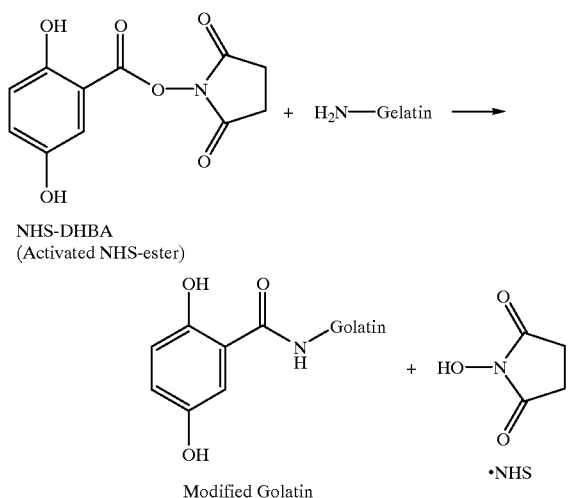

NHS-DHBA
(Activated NHS-ester)

Modified Golatin

Besides free NHS, also unreacted NHS-ester remains after the coupling process.

It was found that NHS remaining after gelatin modification increases the hardening speed of gelatin in combination with hardeners such as triazine-compounds. It is well known to an expert in the field of coating photographic emulsions that too high emulsion hardening speeds are undesirable from process point of view in that this may result in the occurrance of defects such as emulsion hardened spots. NHS may also influence photographic properties like sensitivity or fog in adjacent layers by migration after coating of emulsion layers on a substrate.

Also free activated NHS-ester remaining after modification of the gelatin can migrate to adjacent layers causing unwanted effects.

As an example the NHS-ester can be DHBA-NHS. The functional group is a hydrochinon which is capable of scavenging oxidized developer. This functionality is used to prevent migration of oxidized developer between color-forming layers which would otherwise result in a bad color reproducibility. Therefore the modified gelatin is coated between the blue- and green-light sensitive color-forming layers and between the green- and red-light sensitive color-forming layers. It is crucial that this functionality is restricted to these so-called middle layers. Free DHBA-NHS, remaining after gelatin modification, also has scavenging ability. It can migrate to other layers where their scavenging activity will interfere with the normal color-forming reaction.

Contaminants like unreacted NHS-esters or like liberated NHS, should therefor be removed from the reaction mixture.

In manufacturing high quality photographic emulsions there is a demand for reproducible production of essentially impurity- or contaminant-free gelatin batches. Extensive measures are taken to remove impurities or contaminants which can have detrimental effects on silverhalide crystals. It will be obvious to a person skilled in the art that after modification, the modified gelatin is expected to meet the same high standard for purity.

Contaminants like unreacted NHS-esters or like liberated NHS, should therefor be removed from the reaction mixture. A commercially applicable purification method for the process of linking a functional group to gelatin using activated NHS-ester, as described above, has not been disclosed before Removal of remaining NHS or derivatives thereof from reaction mixtures is not specifically mentioned in literature or patents.

In U.S. Pat. No. 5,316,902 gelatin is modified by linking free carboxyl-groups of the gelatin with an amine using a carboxyl-activator. Unreacted amine and carboxyl activator remaining after modifying gelatin are removed from the gelatin matrix by washing at low temperatures.

Another purification method, of which U.S. Pat. No. 5,362,858 is an example, is precipitation of the polymer by adding a hydrophobic solvent.

Also techniques like dialysis are commonly used to remove contaminants or impurities from solutions of proteins like gelatin.

Purification methods as described above are generally unsuitable for large scale production of modified polymers, because long processing time and/or large quantities of washing liquid are necessary, or they result in a diluted product, which makes an additional concentration step, or longer drying, necessary. Clearly these methods have economical and environmental drawbacks.

SUMMARY OF THE INVENTION

Hence the object of this invention was to provide a method for rapid and effective removal of carboxyl-activators, like N-hydroxy-succinimide, or derivatives thereof.

Also an objective of this invention was to remove carboxyl-activators, like NHS, and derivatives thereof in the same purification step.

The invention relates to a process for modifying a water soluble polymer, said process comprising
- modifying a polymer containing amine groups, by reacting at least one of said amine groups with activated ester, said ester being the reaction product of a carboxyl activator and the carboxyl group of a molecule R—COOH, said R-group being a functional group, to produce a reaction mixture containing a polymer, said polymer containing at least one amide group;
- subjecting said reaction mixture to at least ion exchange chromatography to purify said reaction mixture, said purification comprising at least partly removing the said reaction product, and/or carboxyl activator.

It was found, surprisingly, that NHS and its derivatives can be removed from polymer solutions fast and effectively in one step by ion exchange chromatography.

The method is especially applicable for removing NHS and/or derivatives thereof from gelatin solutions, and more specifically for removing NHS and DHBA-NHS from gelatin solutions.

The method of this invention has advantage over conventional methods because it is fast, effective and that NHS and DHBA-NHS can be removed in only one purification step.

A further advantage of the method of this invention is that ion-exchange chromatography is a method generally applied in large scale production of gelatin to remove salts, making the need for additional process equipment superfluous.

DETAILED DESCRIPTION OF THE INVENTION

The invention relates to a process for modifying a water soluble polymer, said process comprising
- modifying a polymer containing amine groups, by reacting at least one of said amine groups with activated ester, said ester being the reaction product of a carboxyl activator and the carboxyl group of a molecule R-COOH, said R-group being a functional group, to produce a reaction mixture containing a polymer, said polymer containing at least one amide group;
- subjecting said reaction mixture to at least ion exchange chromatography to purify said reaction mixture, said purification comprising at least partly removing the said reaction product, and/or carboxyl activator.

From the currently available carboxyl activators NHS is of particular interest, since it distinguishes itself from other carboxyl activators in that a stable activated ester can be prepared and purified before the activated ester is added to a polymer solution. This overcomes the problem that, when the carboxyl activator and the molecule consisting of a carboxylgroup and a functional group are simultaneously added to a polymer solution containing amine- and carboxyl-groups, the polymer itself is crosslinked by activation of its carboxyl-groups followed by linking with its amine-groups.

The separate preparation of activated NHS ester is achieved by the following reaction, which is described in detail in the comparative example:

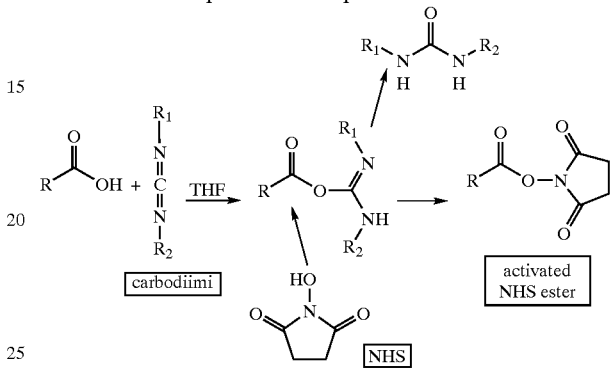

In the molecule R—COOH, R represents a functional group which is a photographically useful group (PUG), comprising:
- Developer scavenging groups, comprising a cresol type, a pyrogallol type, a catechol type, a hydrochinon type or a 2,4-disulphonamidophenol type molecule.
- UV-light absorbing groups, comprising UV-absorbing dyes as described in RD*September 1994/501–541, which are exemplified by but not limited to:
  cyano substituted butamines, acetylenic compounds, hydroxyphenyl benzotriazoles, triazines, quercetines
- Optical brightening groups, comprising optical brightening agents as described in RD*September 1994/501–541, which are exemplified by but not limited to:
  thiophenes, stilbenes, triazines, imidazolones, pyrazolines, triazoles, acetylenes.

The activated ester is thus prepared by the following reaction, in which the carbodiimide is dicyclohexyl-carbodiimide (DCC):

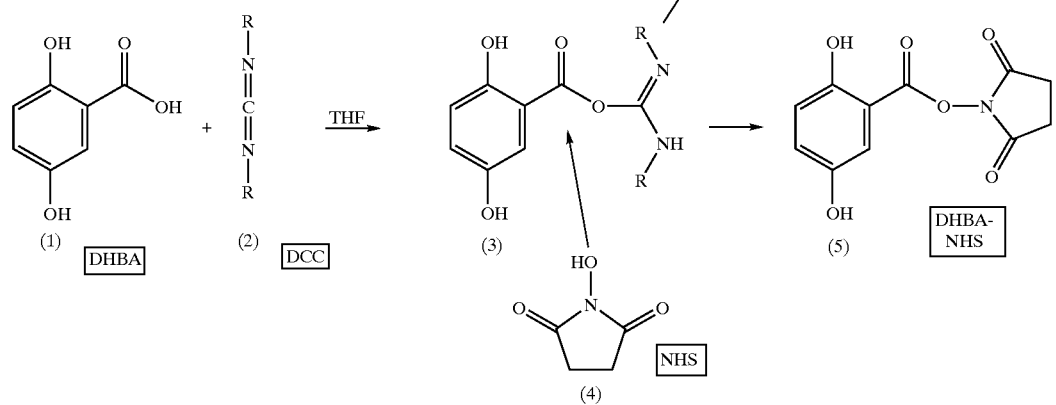

DCU is removed by filtration. The activated ester can be isolated, if necessary, from the reaction mixture by crystallisation. In the case of the example as shown hereabove, the THF is partly evaporated to crystallize DHBA-NHS after which the crystals are filtered off and washed with THF to obtain pure DHBA-NHS.

Upon addition of the activated DHBA-NHS ester to a gelatin solution, the NHS is substituted by an amine group of gelatin. As a result, a chemically modified gelatin is obtained which has now the new scavenger-functionality superimposed onto it, while NHS is liberated. This synthesis can be carried out in gelatin solutions up to about 20 wt. %, within a temperature range between about 35° C. and 60° C. and in a pH-range from about 5 to about 9.

Higher gelatin concentrations or lower temperatures are in practice not feasible because viscosity will be too high or gelation will occur. Too high temperatures and/or pH are avoided since this will lead to decomposition of gelatin or the activated ester. Gelatins like recombinant gelatins or synthetic gelatins or special treated gelatins like hydrolyzed gelatins may be utilized within wider limits of the parameters described above. Hydrolyzed gelatins, for example, can still be applied at lower temperatures of about 20° C.

With the synthesis as described above, DHBA-NHS can be linked to amine groups of a gelatin. The number of amine groups present in the gelatin will set the limit for the number of functional groups which can be linked to gelatin. This may vary between gelatins, depending on treatment (acid- or lime-processed) or on the source (natural gelatin, recombinant gelatin, synthetic gelatin). It is also possible to convert the carboxyl groups into amines as described in EP patent 0487686 thus increasing the amount of available amine groups.

The amount of functional groups, in millimols, linked per gram of polymer is referred to as the 'load' of the polymer.

As a consequence, the amount of NHS liberated during the synthesis is determined by the number of amine groups present on the gelatin.

The polymers to be used for the chemical linking with the functional molecules should at least contain amine reaction sites. The preferred polymers to be applied in photographic systems should be water soluble in order to be compatible with the other coated species. Examples comprise, but are not limited to casein, albumin, sericin, soluble collagen, gelatine, poly-lysine, poly acrylamide, polyvinyl-imidazole, polyvinyl-pyrazole, cellulose derivatives, saccharine derivatives and the like. The most preferred water soluble polymer for our invention is gelatine. Gelatine is a degradation product of bone or skin collagen, which is treated by acid, base, or enzymes. Also recombinant gelatines are currently produced. In general chemical modifications on gelatin take place on free hydroxyl, carboxylic acid or amine groups. The natural gelatine contains ca. 48 mmol/100 g free amine groups originating from the lysine and hydroxy-lysine amino acids present in the peptide chain, hence determining the maximum amount of functional molecules that can be coupled However other polymers may have different maximum load, depending on their amine content. For example, it is possible to use amine-enriched gelatins, i.e. gelatins in which part of the carboxylic acid groups or amine groups is chemically modified with di- or tri-amines as described in EP-0813109. Also specific polymers with a higher amine content than natural gelatin can be synthetically manufactered with recombinant technology.

The load of a polymer can be increased above its innate maximum load by the use of spacers. A spacer is a molecule which can be linked to reactive groups of polymers, like carboxyl-groups or amine-groups of gelatins, said spacer-molecule containing at least two amine-groups capable of reacting with an activated ester, thus increasing the amount of available amine groups hence the maximum load.

Since the reaction between a gelatin and NHS-DHBA does not proceed to completion, the starting material, NHS-DHBA remains after modification of a gelatin. NHS is released when DHBA is coupled to an amine group of the gelatin. It was first attempted to remove N-hydroxysuccinimide or NHS-DHBA using conventional methods like noodle washing, which is well known in manufacturing of gelatin. Noodle washing is done by lowering the temperature of the gelatin solution until it gelates. The contact surface can be increased before washing, for example by extrusion as noodles.

As will be shown in the examples, after 2 hours of continuous noodle washing only 75% of the liberated NHS and only 78% of unreacted NHS-DHBA were removed.

However, when a gelatin solution containing NHS and/or NHS-DHBA was subjected to anion exchange chromatography it was surprisingly found that both contaminants were effectively retained (>99%) by the anion-exchange material. It was also found, surprisingly, that this could be done in 15 minutes, much faster than with methods normally used, like noodle washing. Both a strong basic ion exchanger (Dowex 2×8-400) and a weak basic ion exchanger (Amberlite IRA-93) were effective in retaining NHS and DHBA-NHS.

Suitable anion-exchange materials are examplified by, but not limited to: Dowex2×8-400, Amberlite IRA 93.

Ion exchange purification of gelatin solutions is subject to process limitations like temperature, pH and polymer concentration. At low temperatures under 35° C. and high concentrations, gelatin viscosity is too high or gelation will occur making it impossible to pass the reaction mixture over an ion exchange column. Too high temperatures of about 60° C. or higher are undesired. At such high temperatures hydrolysation of gelatin will occur. pH should be adjusted to an optimal value at which binding of contaminants is optimal, but without too much binding of polymers, like gelatin, which is undesired. Gelatins like recombinant gelatins or synthetic gelatins or special treated gelatins like hydrolyzed gelatins may be utilized within wider limits of the parameters described above. Hydrolyzed gelatins, for example, can still be applied at lower temperatures of about 20° C.

Purification by ionexchange chromatography is already used on large scale in manufacturing gelatin to remove salts, which makes this method economically interesting. A drawback of using ionchromatography as a purification method is that regeneration of the ion exchanger is necessary, in which the retained contaminants or impurities such as proteins, salts, carboxyl-activators like NHS or activated esters like NHS-esters are removed from the ion exchange material. This is solved in practice by using at least two ionexchange columns or beds. One column can be used for purification while the other is being regenerated. The described application of ion exchange chromatography does not particularly impair the regeneration process. A further advantage of the invention is that as a step in the regeneration process the rather expensive carboxyl-activator and the activated ester can be recovered from the ion exchange material in order to be re-used. This also prevents these potentially harmful chemicals from being released into the environment.

The advantages of the invention method will be further clarified by the following examples:

I. COMPARATIVE EXAMPLE

Applying Noodle Washing

Step 1: Preparation of NHS Activated DHBA 2,5-dihydroxy benzoic acid (DHBA) is first activated by treatment with dicyclohexylcarbodiimide (DCC) and NHS in tetrahydrofurane (THF). To a stirred solution of 9.25 g (60 mmole) DHBA in 450 ml of THF was added 7.14 g (62 mmole) NHS and 12.8 g (62 mmole) DCC. After filtering off the formed dicyclohexylurea, the solution was concentrated by vacuum evaporation until crystallisation of the DHBA-MHS ester started. The solution was stored at 5° C. for 12 hrs and the resulting DHBA-NHS precipitate was collected by filtration. After drying the yield of the synthesis was 70%.

Step 2: Coupling of DHBA-NHS to Gelatin 10 g (=40 mmol) of the resulting DHBA-NHS ester was dissolved in 500 ml THF and added to 5 L of a 5% limed bone gelatin solution. The gelatin solution was stirred at 40° C. for 2 hours at a pH of 5.5. The resulting reaction mixture contains DHBA modified gelatin with a load of 18 mmol DHBA/100 g dry gelatin (as determined by the TNBS method) ca 30% of the primary amines is substituted), 8 mmol unreacted DHBA-NHS and 32 mmol liberated NHS.

Step 3: Noodle Washing

1 Liter of the reaction mixture obtained in step 2 was chilled to 5° C. After setting of the gelatin, noodles were prepared, which were washed with continuously refreshed cold water. The temperature was kept at 5° C. to avoid excessive swelling of the gelatin noodles. After 2 hours the noodles were taken out of the washing water and molten again. The remaining total amount of DHBA-NHS ester was 2 mmol, resulting in purification efficiency of 75%. The remainder NHS was determined to be 7 mmol, resulting in a purification efficiency of 78%.

II. INVENTIVE EXAMPLE

Applying Anion-chromatography

A modified gelatin solution was prepared according to step 1 and 2 of the comparative example. 1 L of the gelatin solution was eluted in 15 minutes with two bedvolumes of water on a strongly basic Dowex column (160 g Dowex.material) thermostated at 40° C., The NHS and NHS-DHBA level after the purification step was at least smaller than the detection limit of 1%, resulting in a purification efficiency of at least 99%.

Conclusion

It was found, surprisingly, that both NHS and DHBA-NHS were retained by the anion-exchanger with an efficiency of more than 99%. In comparison with a conventional technique like noodle washing this was proven to be highly efficient. While only 15 minutes were necessary to eliminate the contaminants from the reaction mixture by ion chromatography, it took 2 hours to reach an efficiency of only about 75% with noodle washing. To reach higher efficiencies even longer washing times would be necessary.

What is claimed is:

1. A process for modifying a water soluble polymer, said process comprising:

modifying a water soluble polymer containing amine groups by reacting at least one of said amine groups with at least one activated ester, said activated ester being the reaction product of a carboxyl activator and the carboxyl group of a molecule R—COOH, said R-group being a functional group, to produce a reaction mixture containing a reacted polymer, said reacted polymer containing at least one amide group; and subjecting said reaction mixture to at least ion exchange chromatography to purify said reaction mixture, said purification comprising at least partly removing said reaction product, said carboxyl activator, or a combination thereof.

2. A process according to claim 1, wherein said ion exchange chromatography is anion-exchange chromatography.

3. A process as described in claim 1, wherein said functional group is chosen from the group of photographically applicable molecules consisting of developer-scavenging molecules, UV-light absorbing molecules, and optical brightening molecules.

4. A process as described in claim 3, wherein said developer-scavenging molecule is chosen from the group consisting of cresol type, pyrogallol type, catechol type, hydrochinon type, 2,4-disulphonamidophenol type, and combinations thereof.

5. A process as described in claim 3, wherein said UV-light absorbing molecule is chosen from the group consisting of cyano substituted butamines, acetylenic compounds, hydroxyphenyl benzotriazoles, triazines, quercetines, and combinations thereof.

6. A process as described in claim 3, wherein said optical brightening molecule is chosen from the group consisting of thiophenes, stilbenes, triazines, imidazolones, pyrazolines, triazoles, acetylenes, and combinations thereof.

7. A process as described in claim 1, wherein said reaction product of a carboxyl activator and the carboxyl group of the molecule containing said functional group is linked either directly or via a spacer to at least one amine group of said water soluble polymer.

8. A process as described in claim 1, wherein said water soluble polymer is selected from the group consisting of casein, sericin, soluble collagen, gelatine, polyvinyl pyrrolidone, polyacrylamide, polyvinylimidazole, polyvinylpyrazole, cellulose derivatives and saccharide derivatives.

9. A process as described in claim 1, wherein said water soluble polymer is chosen from the group consisting of natural gelatins, alkaline processed gelatins, acid processed gelatins, chemically modified gelatins, recombinant gelatins, synthetic recombinant gelatins, synthetic gelatins, and combinations thereof.

10. A process as described in claim 1, wherein said carboxyl activator is chosen from the group consisting of N-Hydroxysuccinimide, carbodiimides, carbamoylpyridinium compounds, carbamoyloxypyridinium compounds, di-cation ethers, and combinations thereof.

11. A process as described in claim 1, wherein said carboxyl activator is N-Hydroxysuccinimide and said activated ester is dihydroxybenzoic acid esterified with N-hydroxysuccinimide.

12. A process as described in claim 11 wherein the pH of said water soluble polymer solution is between 4 and 9.

13. A process as described in claim 11, wherein the concentration of said water soluble polymer solution is 20 wt. % or less.

14. A process as described in claim 1, wherein anion exchange chromatography is performed at a temperature of 15° C. to 60° C.

15. A process as described in claim 1, wherein anion exchange chromatography is performed at a temperature of 40° C.

16. A process as described in claim 4, wherein said developer-scavenging molecule is para-dihydroxybenzene.

* * * * *